J. N. MOTTE & A. KOTZ.
RICE HARVESTER.
APPLICATION FILED NOV. 10, 1911.

1,190,939.

Patented July 11, 1916.
2 SHEETS—SHEET 1.

WITNESSES
C. M. Walker.
Newton P. Willis.

INVENTORS
J. N. Motte
Adam Kotz
By A. L. Jackson, Attorney

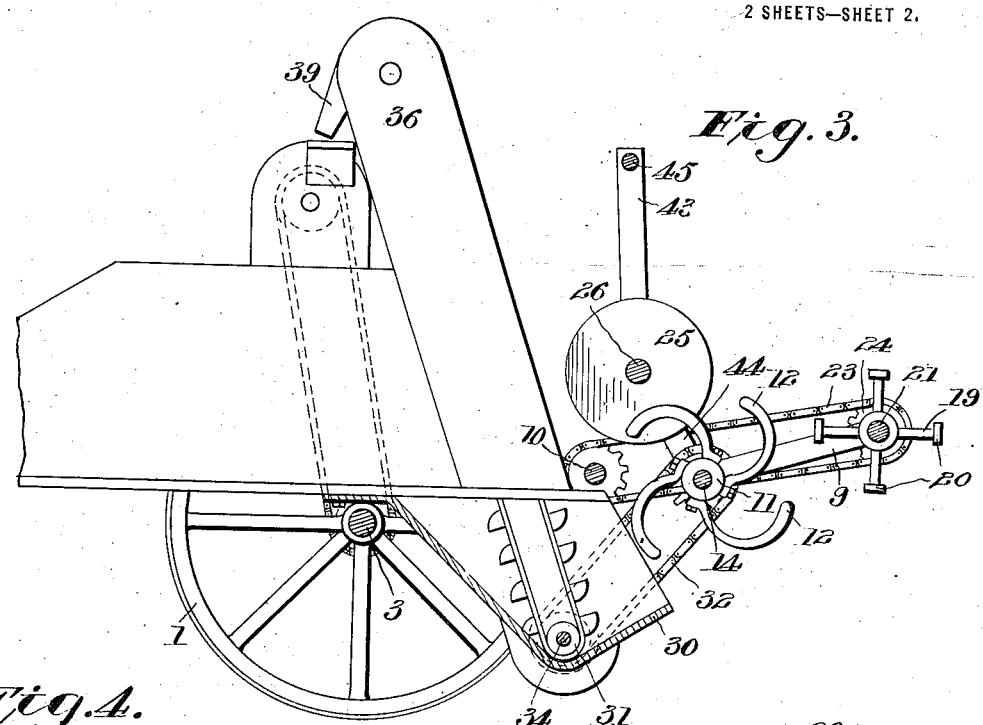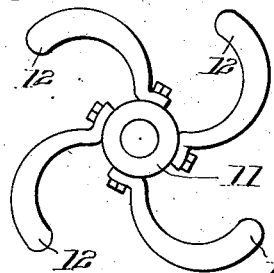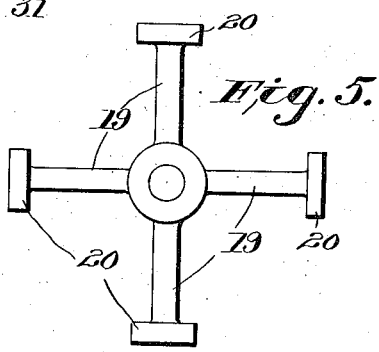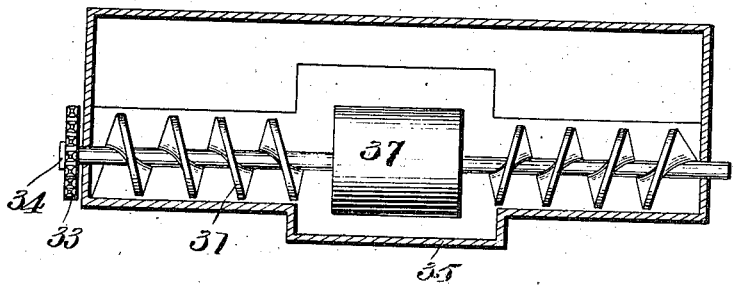

UNITED STATES PATENT OFFICE.

JAMES N. MOTTE AND ADAM KOTZ, OF BEAUMONT, TEXAS.

RICE-HARVESTER.

1,190,939.   Specification of Letters Patent.   Patented July 11, 1916.

Application filed November 10, 1911. Serial No. 659,613.

*To all whom it may concern:*

Be it known that we, JAMES N. MOTTE and ADAM KOTZ, citizens of the United States, residing at Beaumont, in the county of Jefferson and State of Texas, have invented certain new and useful Improvements in Rice-Harvesters, of which the following is a specification.

Our invention relates to harvesting machines and more particularly to machines for harvesting rice, and the object is to provide a machine which will strip the heads from the stalks, gathering the grain and leaving the stalks in the field.

The present method of harvesting rice is very expensive and entails very often tremendous loss. Cutting and binding the rice is very expensive and very often the rice is spoiled by rain and damp weather. This causes the rice to sprout and rot in great quantities. The straw or stalks will not dry quickly but hold moisture and thus ruin the grain. It is well known that the grain will dry quickly when there is nothing on the grains but the husk.

We have provided a machine for gathering only the grain and leaving the straw in the fields. There will be nothing to keep the grain damp. The machine will be very little, if any, more expensive than the harvesters now in use which cut and bind the stalks with the grain.

Other objects and advantages will be fully explained in the following description and the invention will be more particularly pointed out in the claims.

Reference is had to the accompanying drawings which form a part of this specification.

Figure 1:
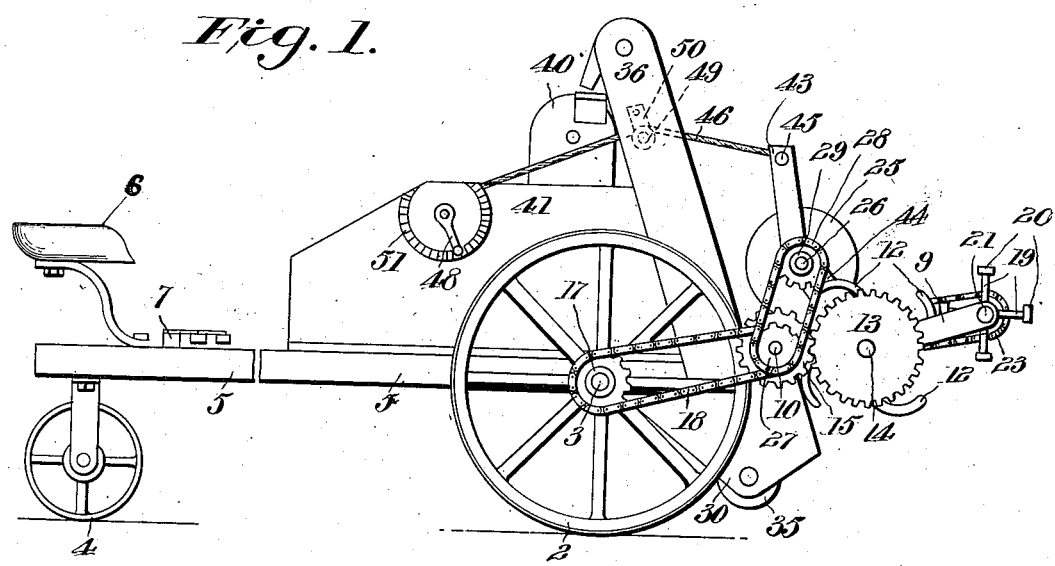
Figure 2:
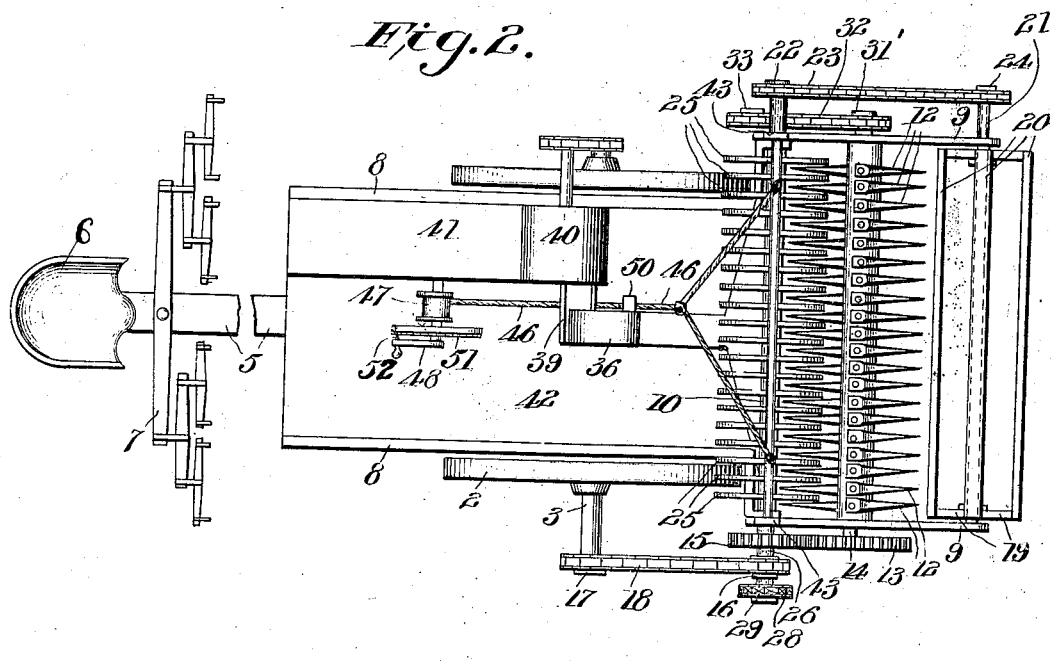

Figure 1 is a side elevation of the machine. Fig. 2 is a plan view of the same. Fig. 3 is a diagrammatic view of the operating mechanism, a part of the casing being shown in section. Fig. 4 is an end view of the stripper cylinder. Fig. 5 is an end view of the feeding cylinder. Fig. 6 is a horizontal section of the casing on a line with the shaft of the spiral conveyer showing the spiral conveyer and the drum for operating the elevator.

Similar characters of reference are used to indicate the same parts throughout the several views.

This machine is mounted on a three wheeled truck and is driven from the rear. The drive wheels 1 and 2 are provided with an axle 3 which is extended for purposes hereinafter explained. The wheel 4 is a guide wheel. The machine is provided with a tongue 5 and a seat 6 is mounted on the rear end of the tongue. Draft appliances 7 for four horses or other draft animals are mounted on the tongue. Main supporting frame pieces 8 are attached to the tongue and mounted on the axle 3. All the operating mechanism is supported by these frame pieces. Frame pieces 9 are pivotally connected to the frame pieces 8 by means of the shaft 10 from which several elements are driven. The machine is provided with a revolving stripper which consists of a cylinder 11 which is provided with a plurality of arms or rows of arms 12 attached thereto and the cylinder is journaled in the frame pieces 9. In practice the arms 12 in a row are placed approximately one-sixteenth of an inch apart at the points where the arms are attached to the cylinder and the arms taper from the cylinder to their points or outer ends. The stripper is driven by gearing as follows: A cog wheel 13 is mounted on the shaft 14 of cylinder 11. A cog wheel 15 is mounted on shaft 10 and meshes with cog wheel 13. A sprocket wheel 16 is also mounted on shaft 10 and a sprocket wheel 17 is mounted on the axle 3. The sprocket wheel 17 drives the sprocket wheel 16 by means of the sprocket chain 18 and the sprocket wheel 16 drives shaft 10. A feeding device is provided for inclining the tops of the rice toward the stripper. This device consists of a reel having arms 19 which carry bars 20 attached to a shaft 21 which is journaled in the frame pieces 9. The shaft 21 is driven from the shaft 10 by a sprocket wheel 22 mounted on shaft 10, chain 23, and a sprocket 24 mounted on the shaft 21. Each bar 20 engages rice heads and moves the same toward the stripper so that the stripper will not leave any heads which might be hanging downwardly in the opposite direction from the stripper.

Means are provided for cleaning the stripper to prevent the clogging of the stripper with straw. A series of disks 25 are mounted on a shaft 26. A disk runs between each pair of or between each two arms 12 in a row and brushes out any straw that may be lodged between the arms. The shaft 26 is driven from the shaft 10 by means of a sprocket wheel 27 which is mounted on shaft 10, sprocket chain 28, and sprocket wheel 29 which is mounted on shaft 26. The disks 25 will brush any straw or grain that may be lodged between the arms and throw the same into the receiver 30. The arms 12 will strip the grain from the rice heads and throw the grain into the receiver 30.

Means are provided for elevating the grain to a separator to be cleaned. A right and left spiral conveyer 31 moves the grain to the central part of the machine. This conveyer is driven from shaft 14 by a sprocket wheel 31' mounted on shaft 14, sprocket chain 32, and sprocket wheel 33 mounted on shaft 34 of the conveyer 31. The grain is carried by the conveyer 31 to the trough 35 from whence it is moved by an elevator 36. The elevator 36 is of the usual character, having cups for carrying the grain upwardly. The endless elevator is driven from the shaft 34, a drum 37 being mounted on the conveyer shaft 34 for driving the elevator. The elevator 36 runs over a drum at the upper end of the elevator which drum may be an idler. The elevator throws the grain into a chute 39 and this chute is inclined and delivers the grain to a separating cylinder which is inclosed in a casing 40. The grain is separated from the straw and collected in the casing 41 from whence it may be placed in sacks. The platform 42 is provided for persons to stand while sacking the grain.

Means are provided for regulating the height of the stripper and feeder. The bearing uprights 43 are rigid with the frame pieces 9 and braced by the bars 44. The bearing uprights 43 are extended above the disks 25 and a bar 45 is mounted in the uprights. A cable or rope 46 is wound on a drum or windlass 47 by a crank 48 and runs over an idle pulley wheel 49 which is mounted in a hanger 50. It is better to connect the cable to the bar 45 in two places near the ends thereof, as shown. By the means thus described the stripper and coöperating members can be elevated for gathering grain from rice of different heights. A rack 51 is provided for holding the cable 46 at whatever position desirable so that the position of the stripper will be fixed at whatever position it may be raised. A spring dog 52 is attached to the crank 48 and will engage the rack 51 at any point it may be stopped.

What we claim is:—

1. A grain harvester comprising a wheeled truck, a shaft for the wheels of the truck, a frame pivotally mounted on said truck, a rotary stripper having a plurality of stripper arms attached thereto and tapering from their bases outwardly whereby said arms are spaced farther apart at the ends to receive the rice heads and to strip the grain therefrom by means of the converging sides of the arms, a rotary shaft having a series of disks running between the stripper arms, and means for driving said stripper and said disks from the shaft of said truck.

2. A wheeled truck having a frame, a pivoted frame mounted thereon, a rotary stripper consisting of a cylinder and a plurality of curved and tapered stripper arms attached thereto and forming V-shaped angles between the arms, and a rotary cleaning device provided with members running between said stripper arms.

3. A harvesting machine comprising a wheeled truck, a rotary stripper carried by said truck and consisting of a cylinder and a series of curved arms attached thereto, said arms tapering from the cylinder to the ends thereof, and rotary disks running between said arms for cleaning the same.

4. A harvesting machine comprising a wheeled truck, a rotary stripper carried by said truck and having a plurality of stripper arms attached thereto, said stripper arms tapering from the stripper outwardly to the tips thereof and forming spaces converging toward the stripper, and rotary disks running between said arms for cleaning the same.

5. A harvesting machine comprising a wheeled truck, a frame pivotally mounted thereon, a rotary stripper mounted in said pivoted frame, a plurality of rows of stripper arms attached to said stripper, said stripper arms forming spaces which converge from the tips of the arms to said stripper, means for vertically adjusting said pivotal frame, and rotary disks carried by said truck and pivoted frame for cleaning said strippers.

6. A rice harvesting machine comprising a wheeled truck, a frame pivoted thereon, a cylinder journaled in said frame, rows of curved stripping arms attached to said cylinder and tapering from the points to form V-shaped angles terminating at the cylinder, a feeding device carried by said frame, means for driving said cylinder and feeding device, means for brushing between said stripping arms, a grain receiver operatively disposed relative to said stripping arms, and a grain elevator for removing the grain from said receiver.

7. A rice harvester comprising a wheeled truck, a pivoted frame carried by said truck, a rotary stripper mounted in said frame and provided with a plurality of curved and tapered arms, said arms having substantial width at their bases and tapered toward their outer ends for grasping rice grains for stripping the same from the stalks, a shaft carrying a plurality of disks disposed in operative relation to said arms and running between said arms to brush the rice grains from said arms, and means for driving said arms and disks.

8. A rice harvester comprising a wheeled truck, a pivoted frame carried by said truck, a rotary stripper mounted in said frame and consisting of a shaft provided with a plurality of rows of curved stripping members attached to said shaft and tapering from their outer ends toward the shaft and forming V-shaped spaces for receiving the grains of rice, a shaft journaled in said frame and provided with disks running between said curved arms for brushing the rice grains therefrom, and means for driving said stripper shaft and disks shaft.

9. A rice harvester comprising a wheeled truck, a pivoted frame carried by said truck, a rotary stripper mounted in said frame and consisting of a shaft or drum provided with a plurality of curved arms attached thereto, a feeding device running in front of said stripper and adapted to bear the rice heads toward the stripper, a shaft journaled in said frame above and to the rear of said stripper and provided with disks running between said curved arms, and means for driving said stripper and feeding device and said disks.

In testimony whereof, we set our hands in the presence of two witnesses, this 16th day of October, 1911.

J. N. MOTTE.
ADAM KOTZ.

Witnesses:
O. H. PENNOCK, Jr.,
B. F. SMITH.